(12) United States Patent
Becker et al.

(10) Patent No.: US 6,417,821 B1
(45) Date of Patent: Jul. 9, 2002

(54) BRAILLE COMPUTER MONITOR

(76) Inventors: John V. Becker, deceased, late of New York, NY (US); by David A. Becker, legal representative, 87 Remsen St., Brooklyn, NY (US) 11201; Daniel E. Hinton, 815 Galway Garth, Arnold, MD (US) 21012-1342; Hugh G. Anderson, Jr., 1755 Manchester Rd., Westminster, MD (US) 21157

( * ) Notice: Subject to any disclaimer, the term of this patent is extended or adjusted under 35 U.S.C. 154(b) by 0 days.

(21) Appl. No.: 09/605,514

(22) Filed: Jun. 28, 2000

Related U.S. Application Data (60) Provisional application No. 60/141,329, filed on Jun. 28, 1999.

(51) Int. Cl.[7] .................................................. G09G 3/00
(52) U.S. Cl. ........................ 345/31; 434/113; 340/407.1
(58) Field of Search ................ 345/31, 108; 340/407.1, 340/407.2; 400/109.1; 434/112–117

(56) References Cited

U.S. PATENT DOCUMENTS

| | | | | |
|---|---|---|---|---|
| 3,363,347 A | * | 1/1968 | Benson | 340/407.1 |
| 3,510,967 A | * | 5/1970 | King et al. | 434/114 |
| 3,594,787 A | * | 7/1971 | Ickes | 340/407.1 |
| 3,659,354 A | * | 5/1972 | Sutherland | 434/114 |
| 3,987,438 A | * | 10/1976 | Lindenmueller et al. | 340/407.1 |
| 4,191,945 A | * | 3/1980 | Hannen et al. | 340/407.2 |
| 4,266,936 A | * | 5/1981 | Rose et al. | 434/114 |
| 4,445,871 A | * | 5/1984 | Becker | 434/114 |
| 4,586,904 A | * | 5/1986 | Chlumsky | 434/114 |
| 4,871,992 A | * | 10/1989 | Petersen | 434/112 |
| 4,898,536 A | * | 2/1990 | Hoffarth | 434/114 |
| 5,685,721 A | * | 11/1997 | Decker | 434/114 |
| 5,718,588 A | * | 2/1998 | Tretiakoff et al. | 434/114 |
| 5,766,014 A | * | 6/1998 | Ida et al. | 434/114 |
| 5,767,764 A | * | 6/1998 | Ida | 340/407.1 |
| 5,772,440 A | * | 6/1998 | Ida | 434/114 |
| 6,022,220 A | * | 2/2000 | Haugen | 434/112 |
| 6,109,922 A | * | 8/2000 | Litschel et al. | 434/114 |

* cited by examiner

Primary Examiner—Regina Liang
(74) Attorney, Agent, or Firm—Katten Muchin Zavis Roseman (57) ABSTRACT

A tactual computer monitor includes rows and columns of rectangular cells. Each cell includes four rows and two columns of movable pins which are felt and read by a blind person. The pins are driven by electromechanical impact drivers and are held in position by resilient elastomeric cords. The impact drivers are carried on a bi-directional printhead which travels beneath the movable pins. An erasing mechanism is provided to positively drive the pins downwardly to erase the characters produced by the printhead.

15 Claims, 13 Drawing Sheets

ALIGNMENT OF PRINTHEAD SOLENOIDS 302 WITH DOT PINS 100

BRAILLE COMPUTER MONITOR

CROSS REFERENCES TO RELATED APPLICATIONS

This application claims the benefit of U.S. Provisional Application No.: 60/141,329, filed on Jun. 28, 1999.

BACKGROUND OF THE INVENTION

1. Field of the Invention

The present invention relates in general to apparatus for displaying Braille characters and relates in particular to an economical Braille computer monitor which displays Braille characters using rectangular cells composed of eight tactile members arranged in two columns of four members each. Such cells are particularly compatible for use with ASCII 8 bit 256 symbol code.

2. Description of Prior Developments

Braille is a language of raised dots read by the fingers. In 1824, Louis Braille, a young blind teacher in Paris, perfected spelling in a sequence of dots, using a sharp stylus to punch indentations into paper fitted over a metal slate. Today, slate and stylus are available as lightweight portable tools, with Braille typewriters and electronic adaptions as well.

Braille, the tactual alphanumerics for the blind, is composed of "cells" with six tactile "dots" that are raised in various patterns. The cell is composed of two columns that have three dots each. By convention, the three dots in the first column are numbered top to bottom as dot 1, dot 2, and dot 3. Similarly, the dots in the second column of dots are numbered as dot 4, dot 5 and dot 6.

Braille is read by passing a finger lightly over the dot patterns, which are "seen" or perceived as letters and words in the same way the sighted perceive ink print.

Sixty-four different symbols, including a blank space, can be made from a cell's 6-dot binary dot-no-dot permutations. Many different alphabets have been coded from the cells and Braille is published in many different languages, 35 in the U.S. alone. Braille prose is written using one of two codes, Grade I or II. There are other codes for mathematics, music, and computers. Grade I is a written Braille letter code for respective ink print letters. Grade II Braille uses symbols, not used for letters and marks, to express common letter combinations such as: ss, tt, ough, th, and the like. Some symbols are used to express whole words, part words and symbols. Symbols include two cell combinations and double duty single cells, for a total of 157 symbols. Grade II Braille increases the reading rate of skilled users by reducing the number of characters needed.

Braille has no dedicated capital or numeric symbols. Capitals are shown by a "6" dot "conditional sign" before a given letter or word. Two position "6" dots are used to indicate the whole word is capitalized. Numbers use the first ten letters of the alphabet (a–j), preceded by the number sign dots 3, 4, 5, and 6. A period is represented by dots 2, 5, and 6 and a comma by a dot 5.

Current state of the art paperless Braille machines use discrete piezoelectric benders (bimorphs) to raise each and every dot. Because bimorph parts are expensive, number in the hundreds and their assembly is complex, the average retail price for such parts was estimated in 1993 to be $25.00 per dot.

Bimorphs have not yielded economies of scale and thus the $6,500 cost per 20 cell (120 dot) unit of 18 years ago, is still about the same today. The latest 80 cell display can cost $20,000 and the host computer software is not included.

Single lines of bimorphs must be read in jerky segments, which can slow reading rates by as much as 50%. This makes them virtually useless as "powerbooks". High costs have perpetuated awkward 6-dot "computer codes" instead of using easier 8-dot codes that are directly transliterable with ASCII's 8 bit 256 symbol codes.

SUMMARY OF THE INVENTION

Figures 1A, 1B:
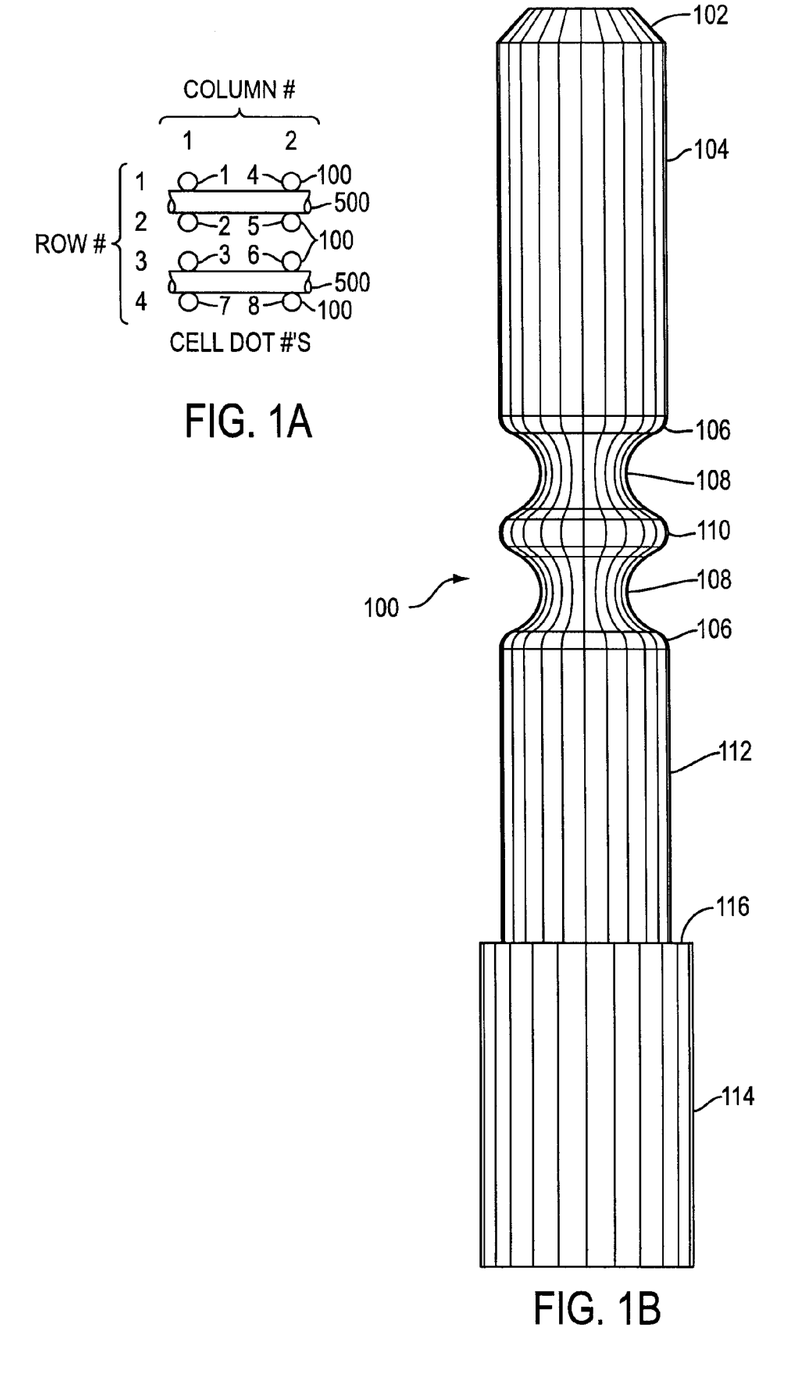
FIG. 1A is a schematic, top plan view of an 8-pin cell arranged in accordance with the invention and showing the position of a pair of elastomeric cords or strips between adjacent rows of pins.
FIG. 1B is an enlarged front elevation view of a tactile dot pin member constructed in accordance with the invention.

The instant invention is directed to an 8-dot, multi-line, paperless Braille monitor that overcomes the above described disadvantages of single line bimorphs. Cell dots 1–6 are assigned the same row and column positions as before. Dots 7 and 8 are positioned in the first and second columns, respectively, just below dots 3 and 6. The 8-dot numbering scheme within a single cell is shown in FIG. 1A. This numbering scheme allows an 8-dot tactual computer monitor to not only display legacy 6-dot Braille, but also facilitates the large ASCII 8 bit, 256 symbol code.

In accordance with the invention, an 8-dot tactual paperless Braille computer monitor (TCM) is constructed as a paperless computer-controlled, realtime, refreshable, electromechanical, multi-line, Braille display or "monitor" device that enables the bind to read, write, or edit Braille documents directly from a mechanical display monitor, rather than from paper, and to communicate simultaneously with sighted computer users. The TCM serves the blind in the same way visual display monitor units serve sighted computer users.

To operate the TCM, the user switches on a host computer. The host computer's automatic self check is displayed and the system's prompts then appear on the top line of the TCM. The user may then call up text on file, edit, or write new text via the host computer's keyboard. The text can be manipulated in the standard manner by the keyboard's directional pad.

To edit the text on screen, the text is highlighted by entering CONTROL/" on the computer keyboard. This is followed by a tap touch on the row and column cell coordinates on the TCM of the first letter of the word/passage to be edited. Next, a double tap touch is applied to the row and column cell coordinates on the TCM of the last letter of the word/passage to be edited. CONTROL/" is entered. At this point the word or passage from the computer keyboard is edited. Then SAVE, RETURN is entered and the program does the rest. Other commands, such as DELETE, INSERT, or MOVE, work in the usual way.

Reading documents with a TCM is done smoothly, in multi-line increments of text which are displayed in an enhanced 8-dot Braille format, read by feel and then erased electro-mechanically, just prior to displaying the next increment of text. Of course, text can also be displayed on the TCM in the conventional 6-dot format. Thus, to read a given increment of a document, the user first prints the increment to the TCM display. Then, feeling the TCM display with one finger, or perhaps with a finger from each hand, the user is able to mentally translate into meaningful words and phrases the collective positions of the many individual dot pins comprising each line of text. Although the TCM can be made to display only a single line of Braille text, it is preferably made to be page size and therefor incorporate several lines, say six, twelve or more. The exact number of lines depends on customer or market preferences balanced by practical considerations for overall size. The instant TCM invention is described herein in terms of six lines each line having 40 tactual Braille cells per line.

When ready to read the next increment of text, the user operates a switch to erase the display of text just read. After the display is erased, the user then queues the print mechanism of the TCM to display the next successive increment of text, or alternatively, the user can scroll forward or backward to display any other increment. Thus, the user can advance or go back through a document in any manner chosen.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 6C is an end view of FIG. 6A;

In the various figures of the drawing, like reference characters designate like or similar parts.

DETAILED DESCRIPTION OF THE PREFERRED EMBODIMENTS

Figure 2:
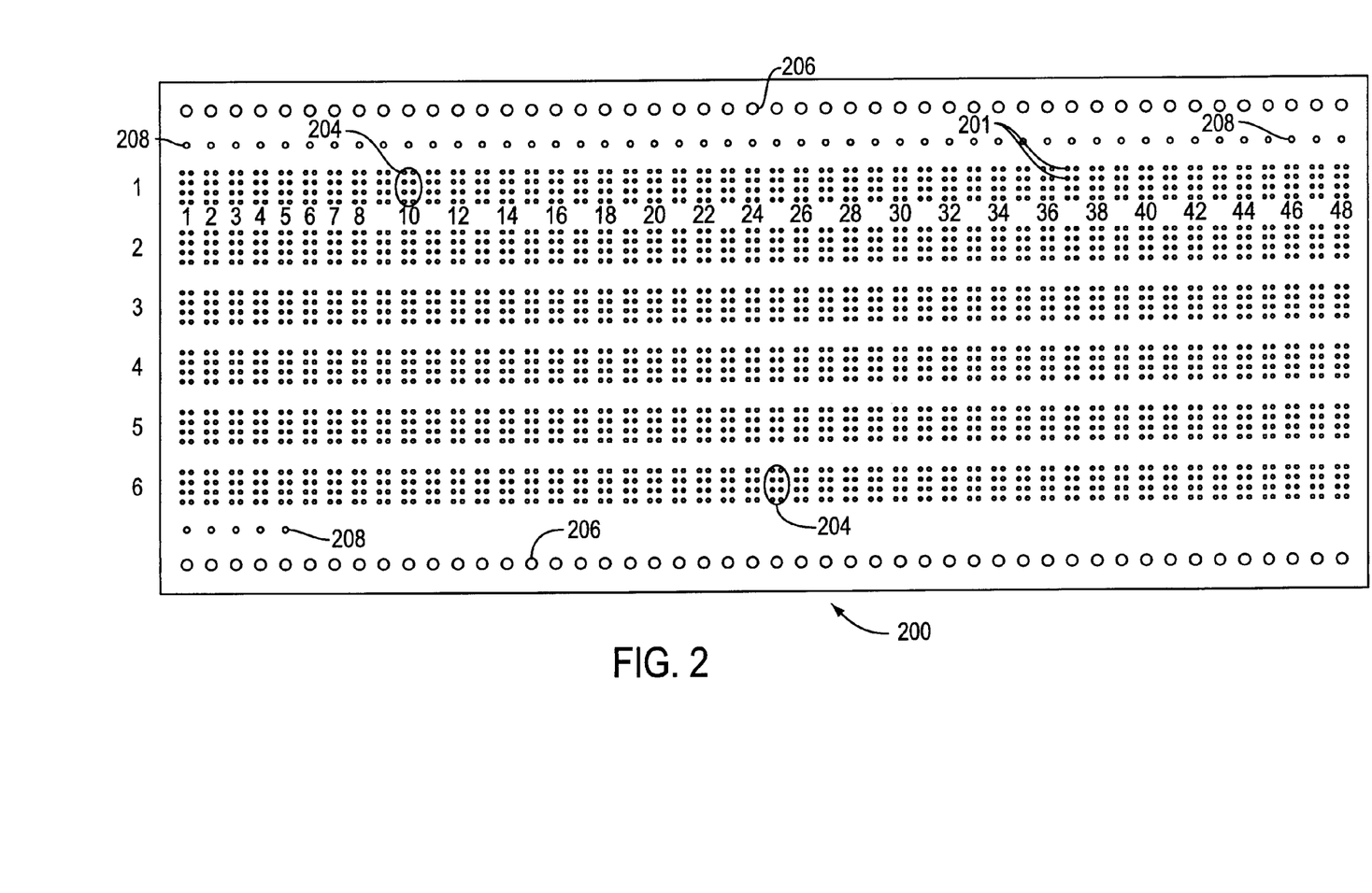
FIG. 2 is a top plan view of a retention plate constructed in accordance with the invention.

In accordance with the invention, a tactual paperless Braille computer monitor, "TCM", includes a two dimensional array of dot pins 100, one of which is shown in detail in FIG. 1B. The dot pins 100, which are mechanically forced up and down to respectively display or erase Braille text, are held in place laterally from one another by a set of three perforated retention plates 200 (FIG. 2). A top plan view of one of the retention plates 200 is shown in FIG. 2 and a side elevation view of three of the retention plates aligned in a vertically spaced series is shown in FIG. 3.

Although 48 cell pattern perforations are provided in each line, as seen in FIG. 2, only the middle forty sets or "cells" of dot pins 100 are moved up, four dot pins 100 per line at a time, to display a forty character line of Braille text. As shown in FIGS. 4A, 4B, and 4C and further in FIGS. 6A and 6B, printhead 300, traveling beneath the retention plates 200, electro-mechanically forces up the dot pins 100 to their raised positions so as to display text. To erase text, all raised dot pins 100 in the display are moved down together, in unison, by the erasing plate 402 of then erasing mechanism 400 shown in FIGS. 3, 5A, 5B and 5C. Mechanical stops limit the vertical travel of the dot pins 100.

Figure 3:
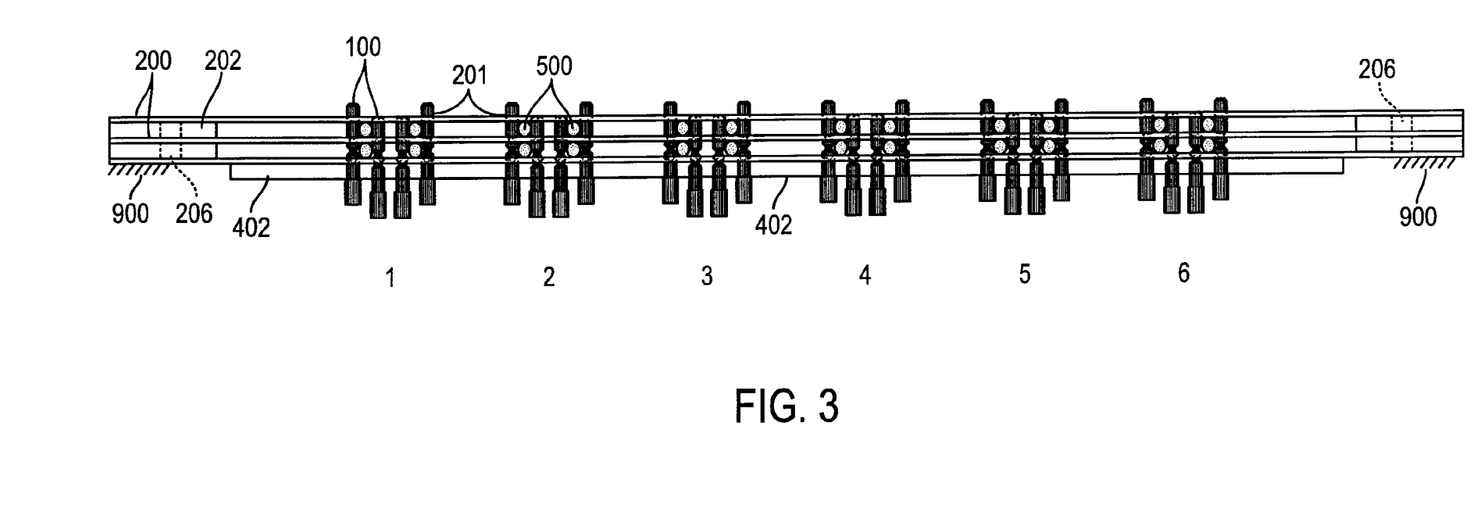
FIG. 3 is a side elevation view, partly in section, showing the arrangement of dot pins in six lines of the TCM and supported by three retention plates, silicone cords and a bottom eraser plate.
Figures 4A, 4B:
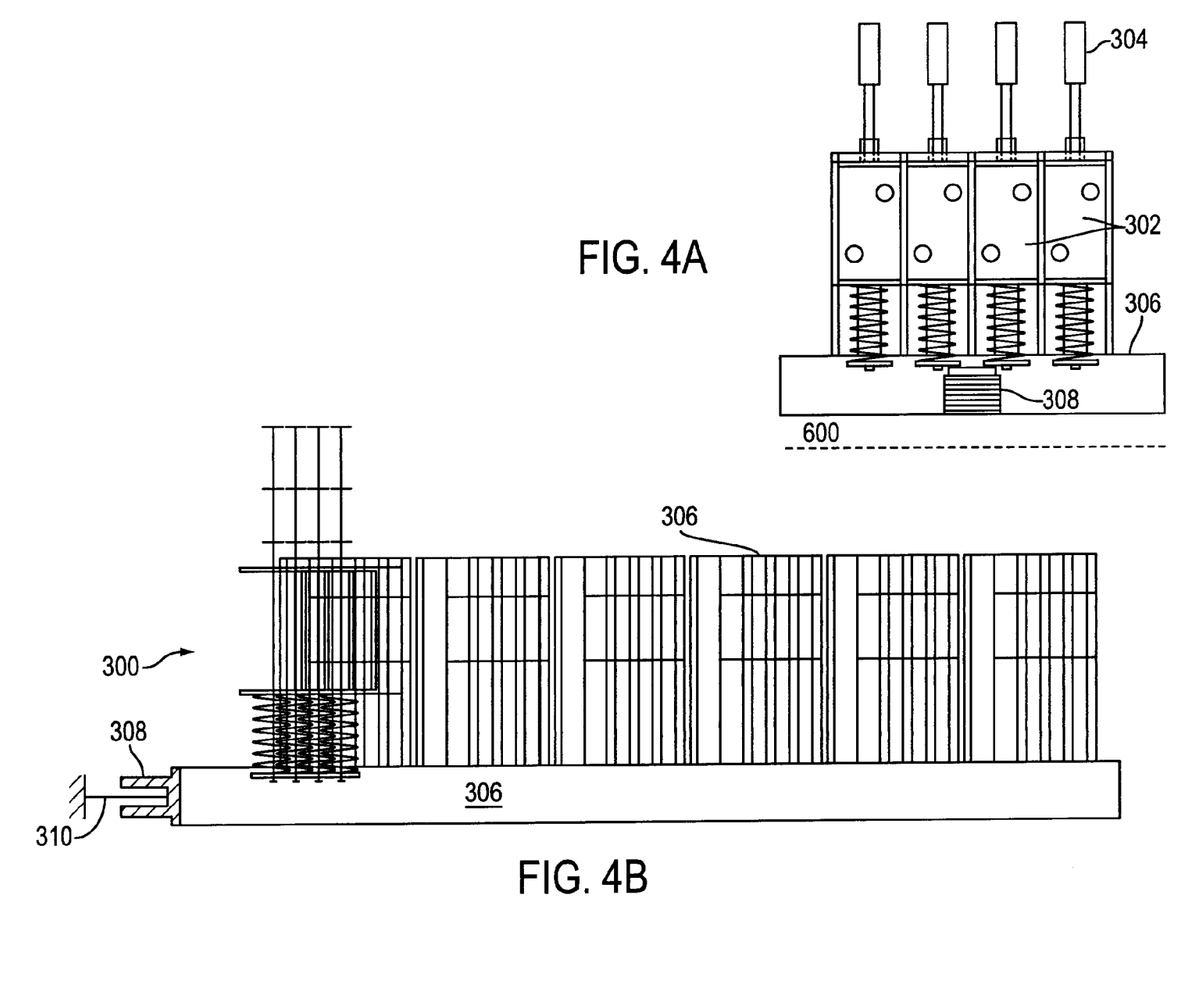
FIG. 4A is a side elevation view, partly in section, of a traveling printhead constructed in accordance with the invention.
FIG. 4B is a left end view of FIG. 4A.
Figure 4C:
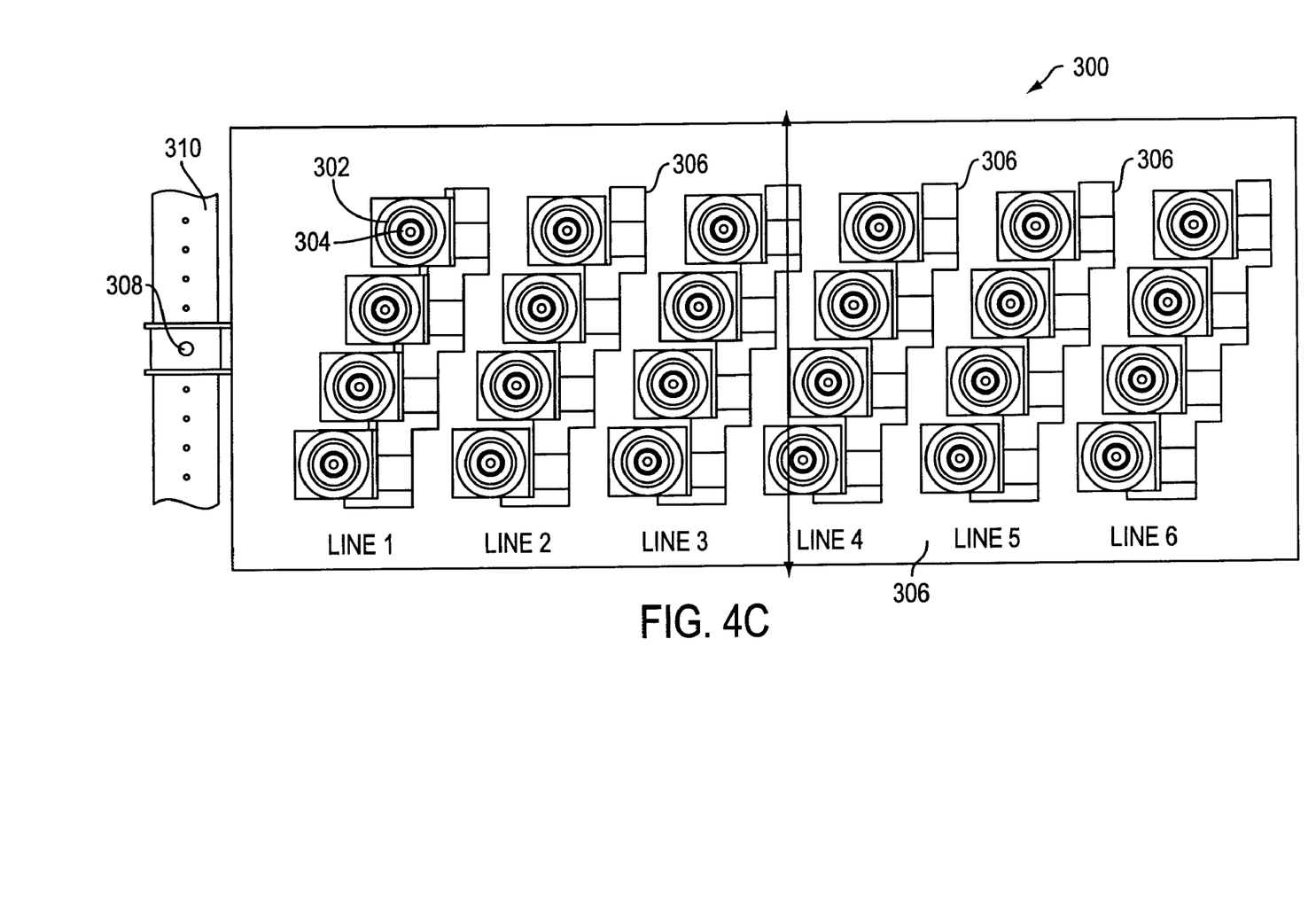
FIG. 4C is a top plan view of FIG. 4A.

As seen in section in FIG. 3, four lengths of small diameter 40 durometer silicone rubber cord 500 are used as detent material to hold the dot pins 100 in the raised position, within each line of Braille display, until they are erased. Once the pins are erased, the cords 500 hold the dot pins in a lowered or retracted position. The four lengths of rubber cord 500 are positioned such that two lengths are situated between the top and middle retention plates 200 and two similar cords 500 are positioned between the bottom and middle plates 200. As further seen in FIGS. 1A and 3, the rubber cord 500 is located between the outer rows of the eight dot pins 100 making up each line of Braille cells, i.e., between row 1 (dots 1 and 4) and row 2 (dots 2 and 5) and between row 3 (dots 3 and 6) and row 4 (dots 7 and 8). In FIG. 1A, the two cords 500 illustrate the relative plan view position of the silicone rubber cords 500 relative to the dot pins 100.

FIG. 3 helps to illustrate the position of the silicone detent material of cords 500 relative to the set of three retention plates 200 and to the dot pins 100 for a six line TCM. The rubber detent material of each cord 500 makes resilient physical contact with the dot pins 100 and the retention plates 200. Four spacers 202 are positioned between the plates 200 for vertical separation of the retention plates. The upper rubber cords 500 act as resilient pin alignment members to help to keep the dot pins 100 in vertical alignment. The lower rubber cords 500 act as resilient pin retention members to hold the pins 100 in their raised position.

As seen in FIGS. 6A, 6B, 7A, 7B and 7C, integrated with the above described assembly are a linear motion undercarriage 600, an electric drive motor 700, a belt power transmission system 800, and a support structure 900. Not shown are a computer interface, an outer casing, a computer and an electronic control package of generally known arrangement.

In a preferred embodiment as shown in FIG. 1B, a 0.375" long dot pin 100 is machined on a Swiss screw machine from 1/16" diameter 2011 T3 aluminum wire stock. Pin 100 has a 0.010" long, 45 degree chamfered surface 102 at the top end (the end felt by a blind person when the pins 100 are raised or displayed). Pin 100 further includes a top section 104 of uniform 0.050" diameter, a double hour glass section with curves of revolution 106, 108, and 110, a lower uniform diameter section 112, which is slightly longer than the top section 104 but of the same diameter, and a bottom uniform 1/16" diameter section 114, forming a square abutment shoulder 116 at the abutment or intersection with the lower cylindrical section 112.

Curved sections 108 and 110 provide annular retention grooves for receiving and holding compliant cords 500, with curved section 110 defining an annular ridge that separates the curved sections 108 and forces the lowermost cords 500 to comply with the overall curved shape of sections 106, 108 and 110. Uniform diameter cylindrical sections 104 and 112 move up and down with a 0.040" stroke in the pre-stamped 0.054" diameter holes 201 (FIG. 2) provided in each one of the set of retention plates 200. The double hour glass section, with curves of revolution 106, 108 and 110, produces a compliant deformation in the detent material of the small diameter 40 durometer silicone rubber cord detent material interposed between adjacent outer cell rows of dot pins 100 and between the bottom and middle retention plates 200.

The compliant deformation of the rubber cord 500 causes lateral elastomeric contact forces to be developed between adjacent outer row dot pins 100 and the lower silicone rubber cords 500. These contact forces hold the dot pins 100 in their displayed or raised positions. The upper silicone rubber cords 500 also exert some lateral elastomeric pressure forces and thus help to keep the dot pins 100 aligned vertically, especially when some dot pins 100 are raised and others are not.

In a six line preferred embodiment, the TCM according to the present invention utilizes three parallel retention plates 200 (FIG. 3) vertically spaced from one another by rectangular block spacer members 202. The retention plates 200 have stamped holes 201 to retain the dot pins 100 in each of the six lines of forty 8-dot cell holes 201, for a total of 320 dot pins 100 per line. The retention plates 200 are stamped from a continuous roll of aluminum stock and cut to a 12" length. As seen in FIG. 2, the retention plates 200 have 48 sets or cells 204 of 8-dot cell holes 201. Only the center 40 8-dot cells or hole sets 204 are fitted with dot pins 100.

The four sets 204 of 8-dot cell holes 201 available on each end of each line are used to facilitate assembly and alignment of the retention plates 200 and holes 201. Also, one set 204 of 8-dot cell holes 201 at the beginning and end of each line can be utilized to designate the line number in a text editing process. An extra line of 8-dot cell holes 201 could also be stamped in the retention plates 200 to indicate cell column coordinates. Thus in this embodiment, six lines could be for Braille text, while a seventh line could be reserved for the text editing process.

As noted above, spacing between the parallel retention plates 200 is maintained by four spacer members 202. Each spacer is 0.060 inch thick by 0.750" wide by 12" long. Two spacers 202 are used at the "north" or upper side of the TCM display and two at the "south" or lower side. As an option, the four spacers 202 can be cut from the sides of twelve 0.020 inch thick retention plates 200. The tooling holes 206 (FIG. 2) in the spacers 202 (FIG. 3) can be lined up with the tooling holes 206 in the retention plates 200. The tooling holes 206 can also serve as the cell column coordinate location holes 208.

The most user friendly cell spacing between cells or cell hole patterns 204 in the same line was found to be about 0.250 while the preferred cell spacing between lines was found to be about 0.6000 inch. In the production of the retention plates 200, the actual cell spacing will vary due to possible variations in production run settings and tool wear. A special tool is used to stamp the 8-dot pin cell hole pattern 204. The horizontal and vertical hole spacing for the 8-dot cell hole pattern 204 is 0.0925 inch. The holes themselves are 0.054 inch in diameter.

Each retention plate 200 is preferably made of 0.0200 inch aluminum roll stock. A stamping tool is used to stamp 6 cells 204 at a time and is moved along the length of the retention plate in 0.2450 inch increments (possible production run variation). As further seen in FIG. 2, the stamping tool also stamps a tooling hole 206, 0.1 inch diameter, on each top and bottom side or border of the 6 cell column. As the tool advances along the length of the retention plate, the tooling holes are used to hold the plate from moving during the stamping progression.

The retention plates 200 also have cell location coordinate holes 208 stamped along the top border and sides. The cell row and column coordinate location holes 208 are each fitted with an editing dot pin 100 corresponding to the coordinate locations of each cell. In this embodiment, there are 40 column editing dot pins 100 and 6 row editing dot pins 100 for a total of at least 46 editing dot pins 100.

The editing pins 100 normally stay in the raised position and are used to mark or highlight the beginning and ends of text to be edited. The editing dot pins 100 are tapped twice to form communication links to the computer to identify beginning and end line coordinate positions. The editing pins 100 have a spring that returns them to the raised position. The twice tapping requirement insures intentional versus accidental communicative desires and is similar to double clicking with a mouse.

As seen in FIGS. 4A, 4B and 4C, a traveling printhead 300 travels back and forth in the direction of the directional arrows in FIG. 4C and drives the dot pins 100 from their lowered or depressed (erased) position to their raised or tactile position. The pins 100 in each line of the TCM display are raised by four miniature solenoids 302, such as Electromechanisms, Inc. Model P25. The solenoids 302 have a preset maximum stroke of 0.0625 inch and have the capacity to deliver a 20 ounce impact force to the bottom of a dot pin 100.

Since the dot pin stroke is 0.0400 inch, it is necessary to set a clearance of 0.0225 inch between the tips of the solenoid plungers 304 and the bottom of the dot pins 100. The solenoids 302 are mounted on a bracket 306 (FIG. 4B), which is attached to a linear motion device 600 as best seen in FIG. 4B and FIG. 6C.

Figure 4D:
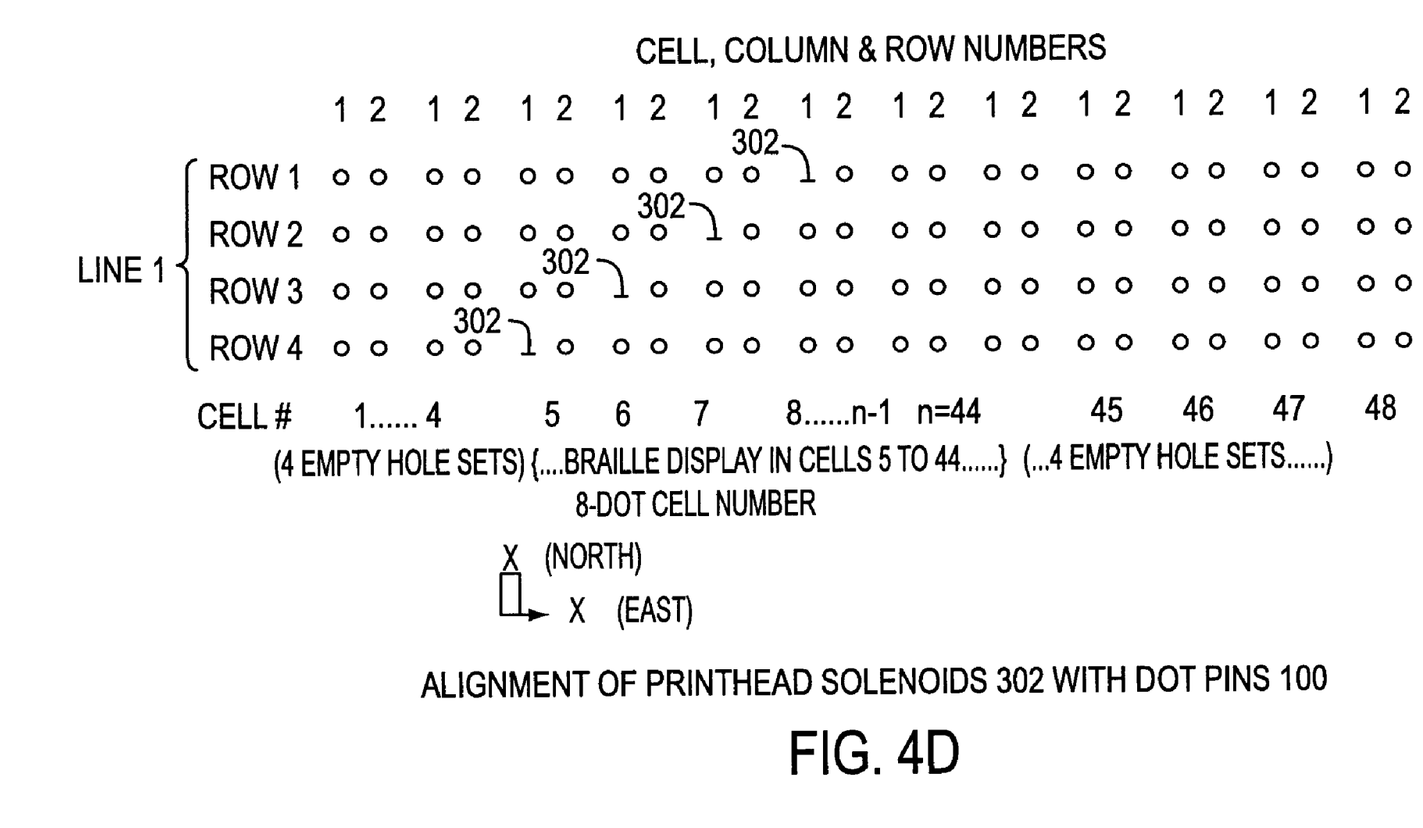
FIG. 4D is a schematic view showing the alignment of the printhead and Braille display, for clarity, solenoids and plungers are shown for Line 1 only.

As seen in FIG. 4D, four solenoids 302 ("_" symbol) are used to print each line, e.g., line 1, and are aligned or spaced from one another diagonally so that there is a solenoid 302 for each of four adjacent 8-dot cells 204 (0.245 " x-(east) direction spacing) but in different dot rows (0.0925" y-(north) direction spacing).

The left (south) to right (north) solenoids 302 line up diagonally with column 1 in cells 5 to 8 respectively. However, in order for every dot pin 100 to be able to be printed, it is necessary, when printing from left to right, for the uppermost leading or "north" solenoid 302 to line up with column 1 of cell 5. Therefore, when prig from left to right first commences, the four leftmost solenoids are not fired, as there are no dot pins 100 in the 8-dot cell hole patterns 1–4 corresponding to their location. Similarly, when printing from right to left, the leading or "south" solenoid 302 must line up with column 2 of cell 45. In the latter situation, the four rightmost solenoids corresponding to cells 45–48 do not fire.

The firing of solenoids 302 and thus the raising of dot pins 100 is controlled by a computer and an optical switch 308 (FIGS. 4A, 4B and 4C). The optical switch 308 is mounted on the traveling printhead assembly 300. The optical switch 308 is used in conjunction with an optical reference plate 310. The optical reference plate 310 is cut from one of the retention plates 200 so as to utilize a single row of at least forty-three 8-dot cell holes. The optical reference plate 310 is stationary and is mounted parallel to the retention plates 200 with its single row of holes aligned with the dot pin holes 201 in the retention plates 200.

In the embodiment shown, each cell 204 contains eight dot pins 100. Each dot pin 100 has an up and a down position. In the up or raised display position, the exposed tips of the top portions 104 of dot pins 100 extend 0.032 inches above a TCM display surface typically provided in the form of a cover surface. In the down or erased position, the dot pins 100 are recessed 0.008 inches below the TCM display surface, so as to prevent the reader from interpreting a slightly exposed, but erased dot pin 100 as a printed dot pin 100. Therefore, each dot pin 100 has a travel or stroke of 0.040 inches.

The bottom surface of each dot pin 100 serves as an anvil when struck by a solenoid 302 to drive the dot pin 100 into its raised position. The square shoulder portion 116 of each dot pin 100 limits the upward vertical travel of the dot pin 100 when the shoulder comes into contact with the bottom of the erasing mechanism 400.

The dot pins 100 of the TCM are designed to move in an up and down fashion through the aligned guide holes 201 in each of the three equally spaced (0.080 inch spacing) parallel retention plates 200, of 0.020 inch thickness each. Spacing between the parallel retention plates 200 is maintained by spacers 202 which are 0.060 inch thick. The dot pins 100 also pass through aligned holes in the erasing mechanism 400 noted above.

In operation of the TCM, vertical up and down motion of the erasing plate 402 is limited by the erasing mechanism 400 described below. The lower end of each dot pin 100 is configured with a square shoulder 116 so that when a dot pin 100 is in the raised position, its shoulder 116 acts as a mechanical stop against the bottom end of the erasing plate 402. This prevents the top of the dot pin 100 from extending above the display surface of the TCM more than 0.032 inches.

Thus, in the printing mode, upward motion of a dot pin 100 is arrested when its square shoulder 116 comes into contact with the eraser plate 402. The square shoulder 116 is also captured by the eraser plate 402 when the display is erased. Several variations of the erasing mechanism are considered possible. All variations accomplish the same task: the 0.0400 downward movement of the eraser plate 402.

Figure 5A:
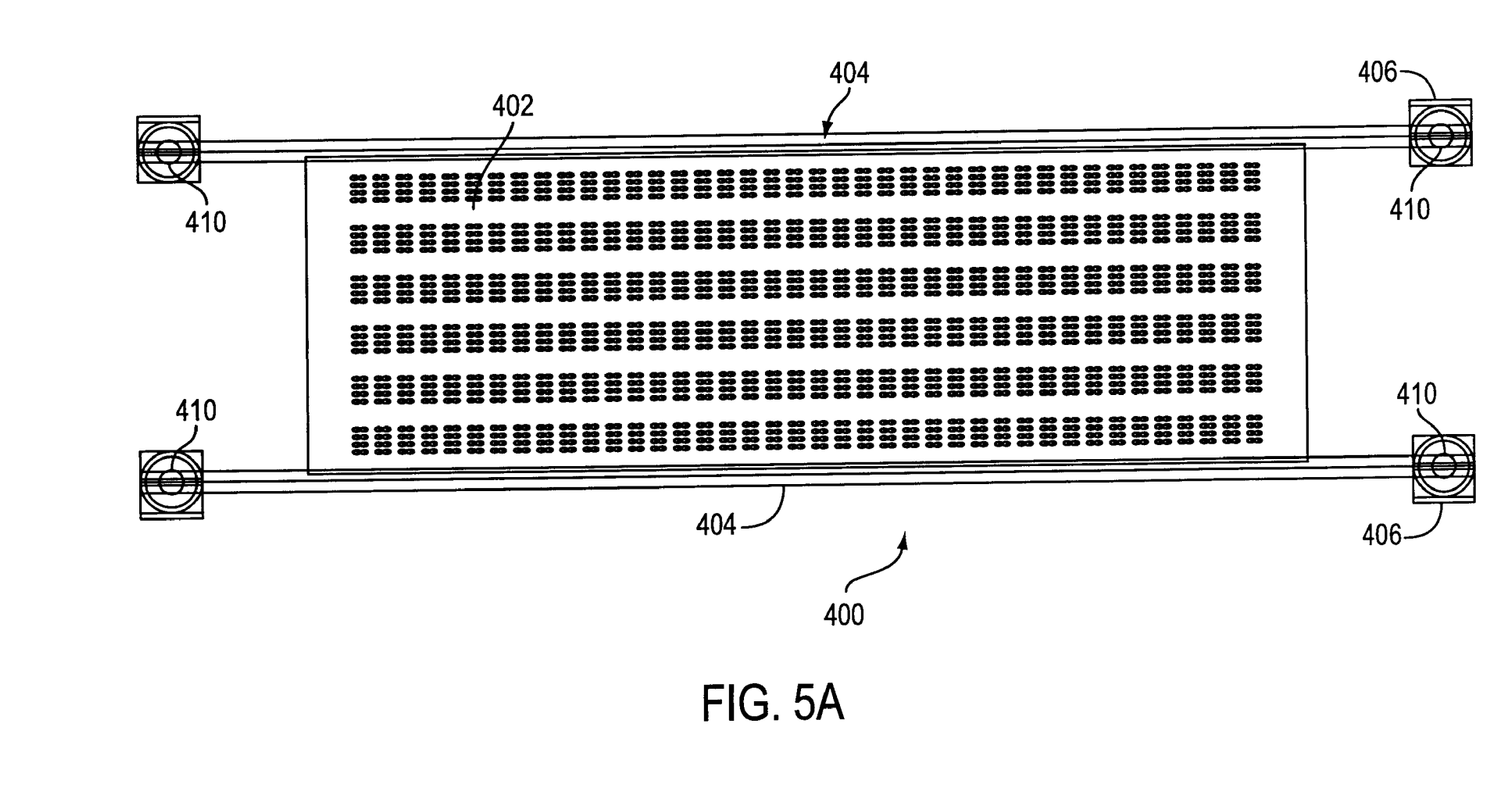
FIG. 5A is a top plan view of an erasing mechanism constructed in accordance with the invention.
Figure 5B:
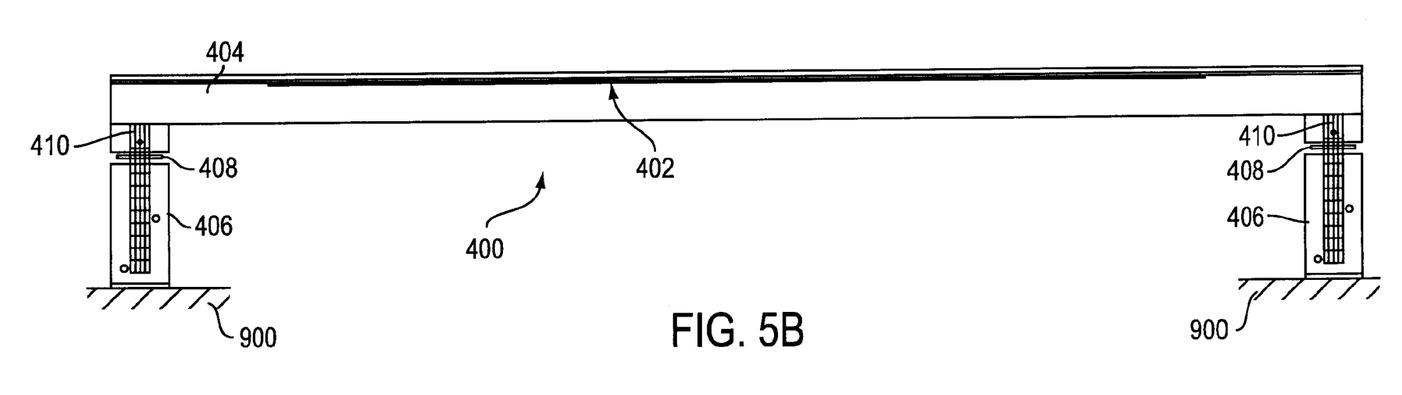
FIG. 5B is a side elevation view of FIG. 5A.
Figure 5C:
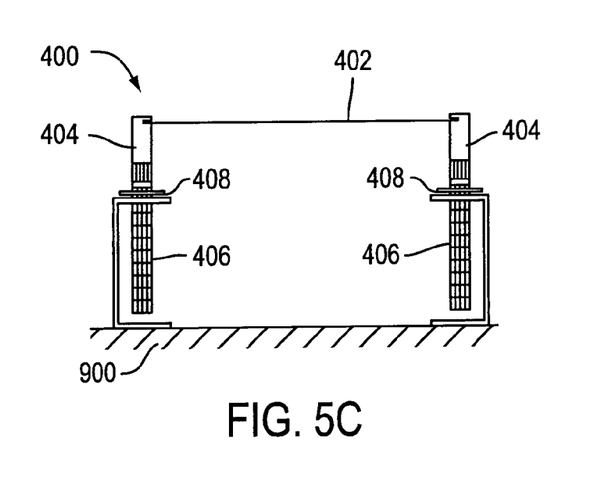
FIG. 5C is an end view of FIG. 5B.

In the first variation shown in FIGS. 5A, 5B and 5C, the easing mechanism 400 is a simply supported, channel shaped, beam structure whose assembly includes the eraser plate 402 and two parallel beams 404 laterally connected at their tops by the eraser plate 402. The four ends of the beams 404, in controlled motion, are moved down in unison by linear actuators 406 by the amount of desired dot pin travel (0.040 inch). After the solenoids 406 fire, thereby erasing the display, spring washers 408 on the plungers 410 of the solenoids 406 return the eraser plate 402 back to its normally up position.

The eraser plate 402 and the beams 404 can be configured as a one piece uniformly thick flat plate bent into the shape of a channel. In any configuration, the erasing plate 402 has to resist shear and bending forces imposed by drag forces that resist the motion of the dot pins 100. The beams 404 should be dimensioned such that all bending deflections are about two or three orders of magnitude smaller than the amount of beam travel, e.g., 0.0004 inch. The ends of the beams 404 are mounted on linear actuators 406 capable of delivering the forces necessary to effect desired beam motion.

For example, the linear actuators 406 can be electromechanical solenoids, air cylinders, or cam operated devices attached to the beam to cause the desired motion. Past experience with a three piece integrated beam structure for a single line TCM was fraught with difficulty, owing to the inadequate metal thicknesses of the eraser plate 402 and the beams 404, and their resulting inability to resist bending moment deflections imposed by dot pin drag forces. Part of the difficulty was from working with legacy dot pin dimensions. Therefore, in configuring an erasing mechanisms 400 especially for multi-line TCMs, the following are recommended:

A. Accurately determine dot pin 100 drag forces

B. Configure a robust one-piece channel-shaped beam structure for the erasing mechanism 400. This configuration may require drilling or laser cutting the 8-dot cell hole patterns 204.

C. Lengthen the lower diameter section 112 of the dot pins 100 to accommodate the increased metal thickness of the erasing mechanism 400.

Figure 8:
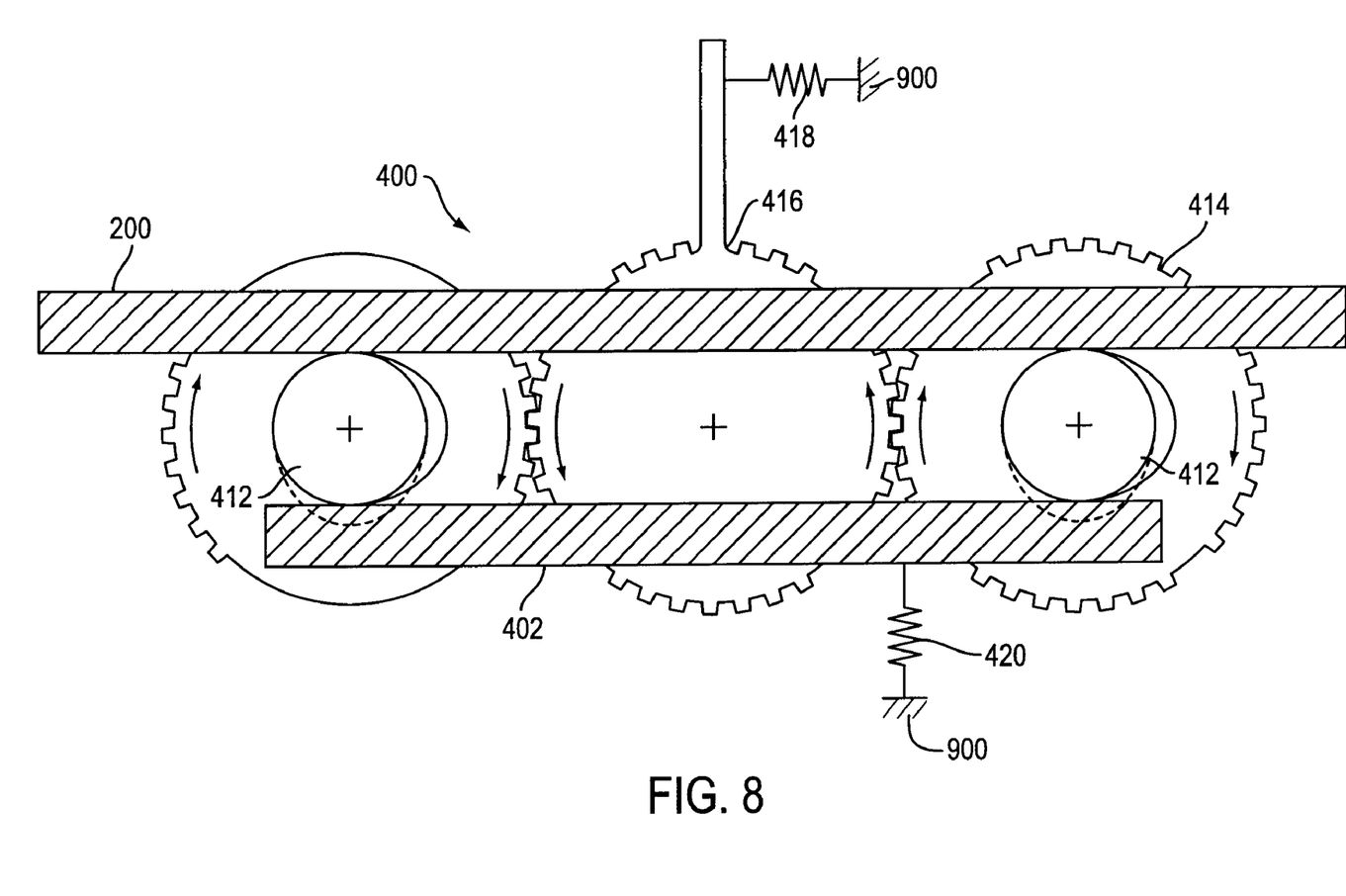
FIG. 8 is a side elevation view, partly in section, of an alternate erasing mechanism using twin cam rods.

In the second variation shown in FIG. 8, the erasing mechanism 400 includes the erasing plate 402 as described above and two cam rods 412. The cam rods 412 are located between the bottom retention plate 200 and the erasing plate 402 along the length of their sides. To erase the display, the twin rods 412, with cam-shaped cross-sections, are given a 90 degree angular rotation, thereby exerting a uniformly distributed separating force along the entire length of the sides of the erasing plate 402 and the bottom retention plate 200. The erasing plate 402 is still subject to the same bending as that of the first variation noted above. The cam rods 412 must be of sufficient cross-section to resist torsional twist.

The twin cam rods 412 have geared ends 414 that mesh with a drive pinion 416 located midway between them. The drive pinion 416 has a spring 418 to return the drive pinion from its rotated position back to its normal position. A 90 degree rotation of the drive pinion 416 causes the cam rods 412 to rotate 90 degrees, forcing the erasing plate 402 and the dot pins 100 to move downward relative to the retention plate 200, thereby erasing the TCM display. The erasing plate is floated and supported on springs 420 to lift the erasing plate back up against the bottom retention plate 200 after erasing occurs.

Figure 9A:
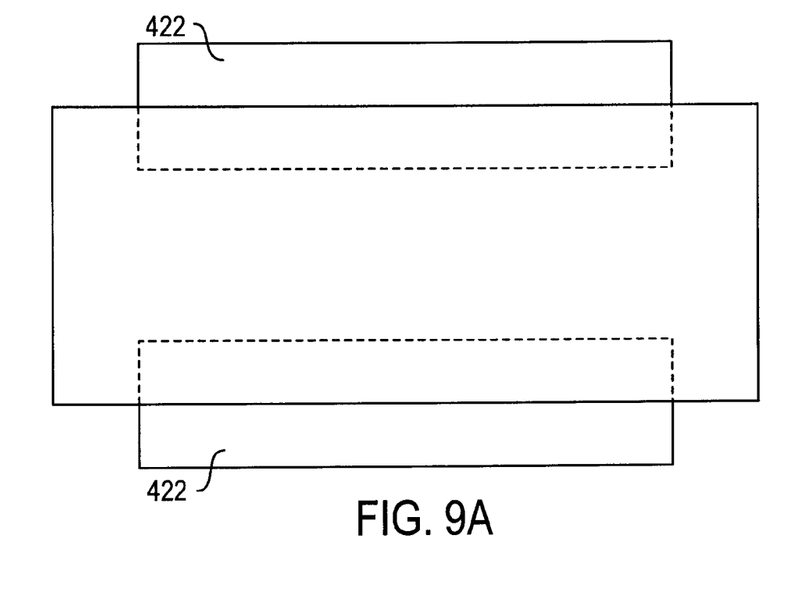
FIG. 9A is a top plan view of another alternate erasing mechanism using a pair of wedge actuators.
Figure 9B:
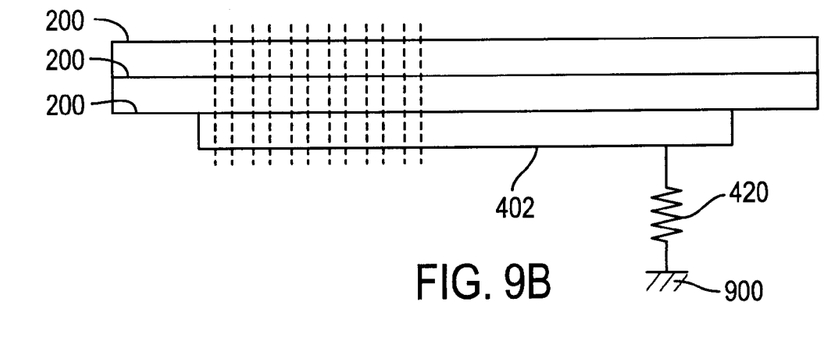
FIG. 9B is a side view of FIG. 9A.
Figure 9C:
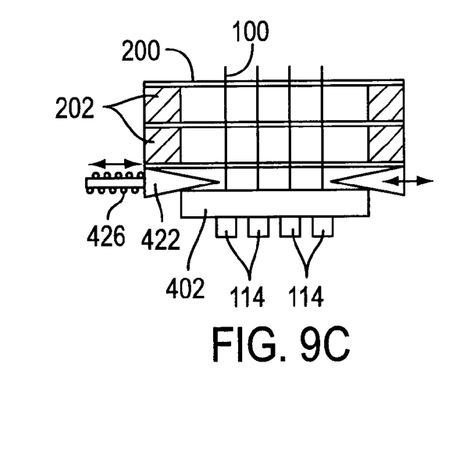
FIG. 9C is an end view of FIG. 9B.

In a third variation of erasing mechanism shown in FIGS. 9A, 9B and 9C, twin tapered wedges 422 are moved laterally inwards towards one another to increase the vertical space between the erasing plate 402 and the bottom retention plate 200, thereby erasing the display. The wedges 422 are moved by linear actuators 424. The actuators 424 can be operated by mechanical, electrical, pneumatic, or other means and can have mechanical springs 426 to return the wedges to their normal outward position.

The linear motion undercarriage 600 in the embodiment shown in FIGS. 4A, 6A, 6B and 6C can be any one of several commercially available linear motion devices such as a Thomson Miniature Accu-Glide Model 10. The undercarriage 600 includes a carriage 602 that moves linearly along a fixed guide 604.

Figures 7A, 7B, 7C:
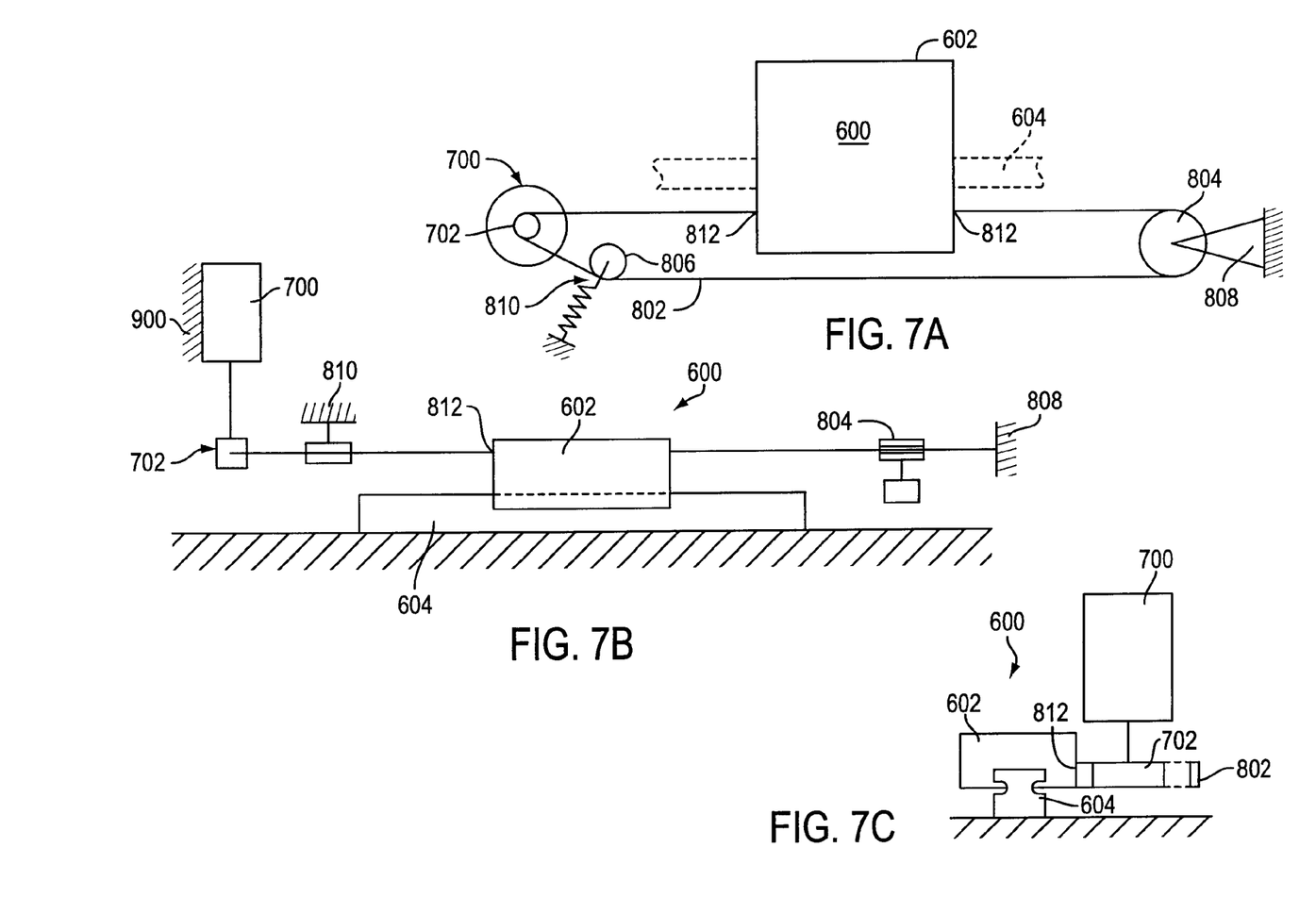
FIG. 7A is a top plan view of an electric drive motor connected to a belt drive which drives the linear motion undercarriage.
FIG. 7B is a side view of FIG. 7A.
FIG. 7C is an end view of FIG. 7B.

An electric drive motor 700 shown in FIGS. 7A, 7B and 7C can be any one of several miniature commercially available reversing d.c. electric motors, commonly used in various printing devices. The motor 700 is mounted underneath one end of the TCM display, vertically between the retention plates 200 and the linear motion undercarriage 600. The electric drive motor 700 is fitted with a toothed drive pulley 702 for driving a toothed power transmission belt 802. During the printing mode, the electric drive motor 700 drives the traveling printhead 300 along the linear motion undercarriage 600. Because, the motor 700 is reversible, it enables the traveling printhead 300 to print the Braille display in either direction of travel.

Figure 6A:
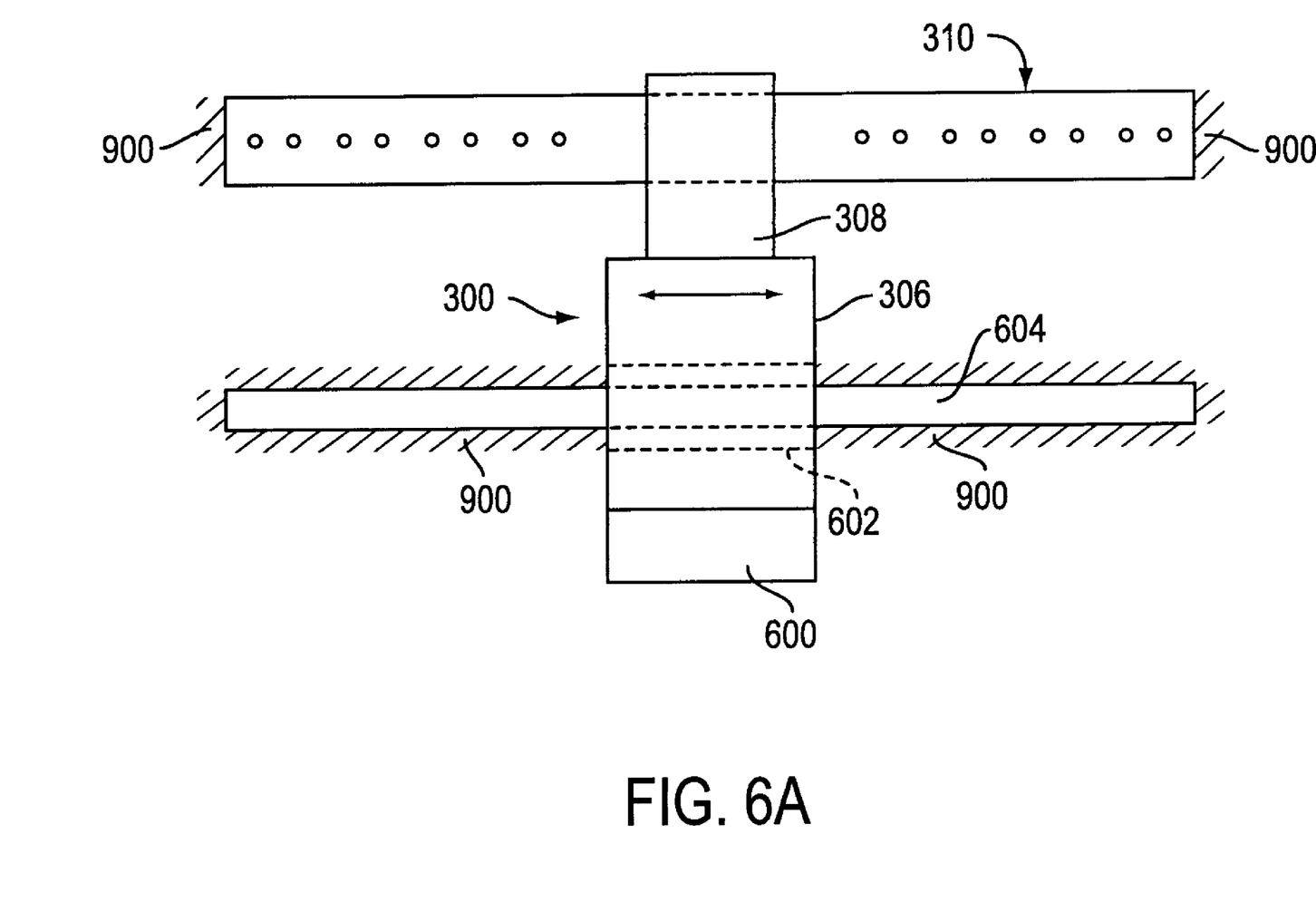
FIG. 6A is a top plan view of the printhead 300, of FIGS. 4A, 4B and 4C, that travels bi-directionally along the linear motions undercarriage 602 and 604 in firing alignment with the braille display through the optical reference plate 310.
Figure 6B:
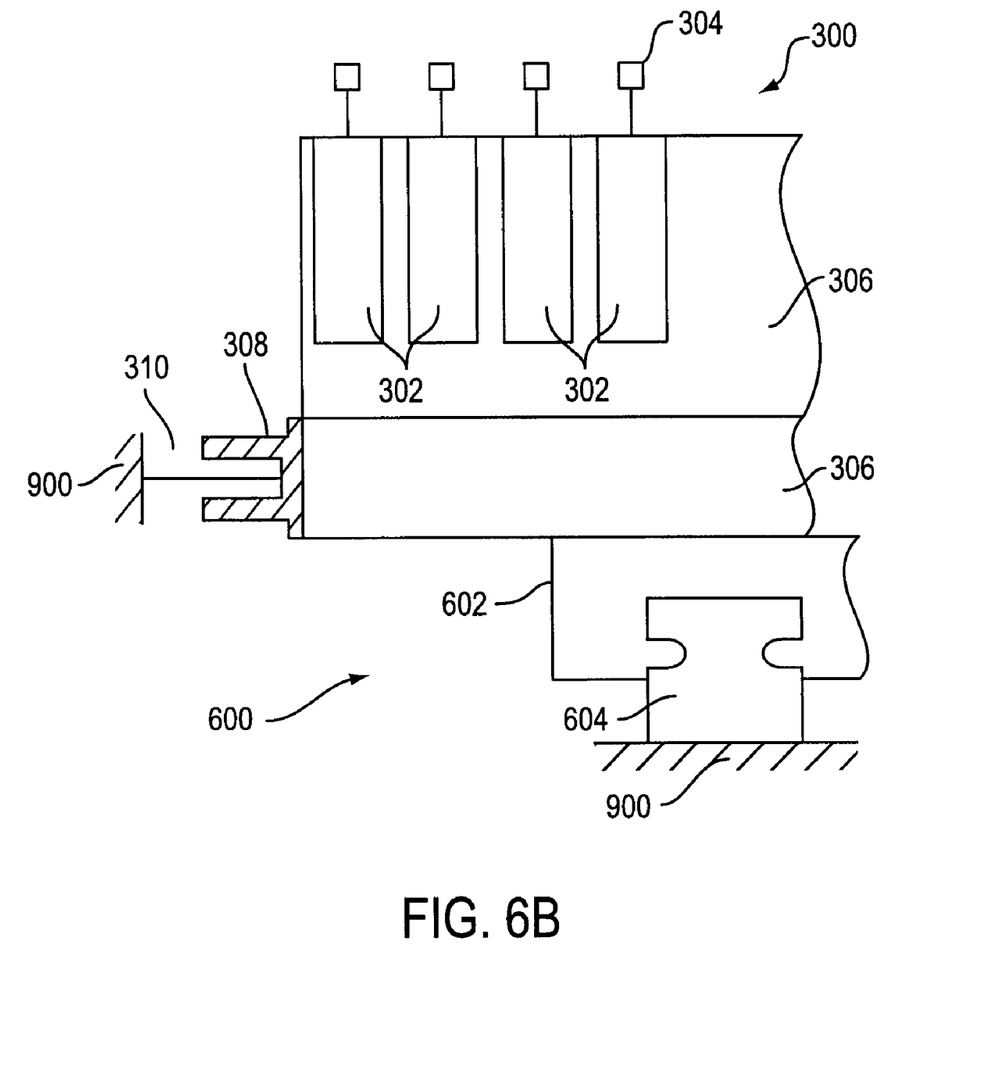
FIG. 6B is an end view of 6A.

As further seen in FIGS. 7A, 7B and 7C, the belt power transmission system 800 includes a lightweight, toothed, plastic power transmission belt 802, a fixed pulley 804, an idler pulley 806, pulley mounting brackets 808, a spring loaded belt tensioning mechanism 810, and a belt coupling clamp 812. The belt 802 is held in tension by the tensioning mechanism 810 against the drive, fixed, and idler pulleys 702, 804, and 806 and is coupled to the traveling printhead 300 via the belt coupling clamp 812, such that electric motor 700 operation transforms motor 700 output shaft rotational motion into linear motion along the linear motion undercarriage 600. The structural relationship of the undercarriage 600 and the printhead 300 is shown in FIGS. 6A, 6B and 6C.

As seen in the various figures, a support structure 900 such as the framework of the TCM serves as a foundation and mounting base for all other parts. Location of functional parts relative to one another is accomplished through precision machining and provision of vernier adjustment capabilities.

The user interface for the erasing mechanism 400 is a hand operated electronic switch that is surface mounted on the outer casing of the TCM, so as to be easily and readily accessible to the user for the purpose of erasing the Braille display. This normally open switch, when closed, connects an external TCM power supply to the devices that erase the display, e.g., the electro mechanical solenoids.

A standard computer interface is connector-mounted on the traveling printhead 300 and connects the TCM to a standard computer. The printhead solenoid 302 and optical switch 308 are hard wired to the connector. The outer casing of the TCM is a conformal shell or wrapper that provides a smooth interface for the user while preventing the user from exposure to the inner workings of the TCM.

The computer can be any computer which is compatible with the computer command and control electronics software adapted for the TCM. The computer command and control electronics hardware and software permits the user to read, write, and edit computer documents.

As can be understood from a review of FIGS. 4A, 4B and 4C, as the printhead 300 travels linearly underneath the TCM display, the optical switch 308 lines up sequentially with one of a series of holes in the timing reference plate 310. The linear spacing of the holes in the timing reference plate 310 is identical to the linear spacing of holes 201 and pins 200 in the retention plates 200 and in the eraser plate 402. Just an instant before precise optical alignment occurs, the solenoids 302 mounted on the print head 300 fire against the dot pins 100 and thereby display Braille text. The solenoids 302 receive the signal to fire from the computer and the electronic control and software package.

The TCM provides means for a blind person to incrementally read, write, or edit a computer document directly from a display, rather than from paper. Thus, a blind person is enabled to read books, magazines, newspapers, and other articles of interest without being encumbered by paper. Further, a blind person is enabled to compose or edit computer documents in much the same way sighted computer users do.

There has been disclosed heretofore the best embodiment of the invention presently contemplated. However, it is to be understood that the various changes and modifications may be made thereto without departing from the spirit of the invention.

For example, more rows and cells could be added, or the TCM could be reduced to a single line display device, or other departures could be made from the descriptions made of various preferred embodiments.

In another example, a display consisting of a single sheet of material such as polyethylene containing Braille cells formed in a pattern of binary flaps, hemispheres, or other shapes that are arranged in an ASCII 8 bit 256 symbol code are used in lieu of the combination of dot pins 100 and retention plates 200. The hemisphere bubbles are pushed up or down to display or erase Braille text after a manner developed above or utilizing peg punch technology.

What is claimed is:

1. An apparatus having a cell of tactile members for producing alphanumeric characters, comprising:
    at least eight of said members arranged in a rectangular pattern defined by two parallel columns of said members arranged in four rows having two of said members in each row,
    wherein each of said members further comprises an upper section, a lower section and a double hourglass middle section, said middle section defined by a pair of curves of revolution separated by an annular ridge.

2. The apparatus of claim 1, further comprising means for raising and means for lowering each of said members respectively into a tactile and a non-tactile position.

3. An apparatus for generating patterns of tactile characters, comprising:
    a plurality of tactile members arranged in a line;
    a driver for selectively driving preselected ones of said tactile members into a tactile position;
    an eraser for moving said tactile members from said tactile position to a non-tactile position;
    a support resiliently supporting said tactile members in said tactile and non-tactile positions; and
    a plurality of perforated retention plates holding said tactile members in predetermined positions;
    wherein said support further comprises a plurality of resilient cords disposed between said tactile members,
    wherein said tactile members each further comprises a plurality of grooves formed therein, and
    wherein said plurality of resilient cords are accommodated within said plurality of grooves and between said retention plates.

4. The apparatus of claim 3, wherein said tactile members are arranged in a plurality of rectangular cells each comprising at least eight of said tactile members.

5. The apparatus of claim 3, wherein said tactile members comprise pin members.

6. The apparatus of claim 5, wherein said pin members each comprise a pair of grooves formed therein.

7. The apparatus of claim 3, wherein said driver comprises an impact device.

8. The apparatus of claim 7, wherein said impact device comprises a solenoid.

9. The apparatus of claim 3, wherein said eraser comprises a solenoid.

10. The apparatus of claim 3, wherein said driver comprises a traveling printhead.

11. The apparatus of claim 3, wherein said eraser comprises a perforated plate.

12. The apparatus of claim 3, further comprising an electric motor for driving said driver back and forth adjacent said tactile members.

13. The apparatus of claim 3, where said eraser comprises a pair of rotary cams.

14. The apparatus of claim 3, wherein said eraser comprises a pair of wedge members.

15. The apparatus of claim 3, wherein said tactile members abut against said eraser during erasing.

* * * * *